Dec. 23, 1941.  L. E. RUSSELL ET AL  2,267,308
STEERING WHEEL KNOB
Filed Aug. 29, 1940
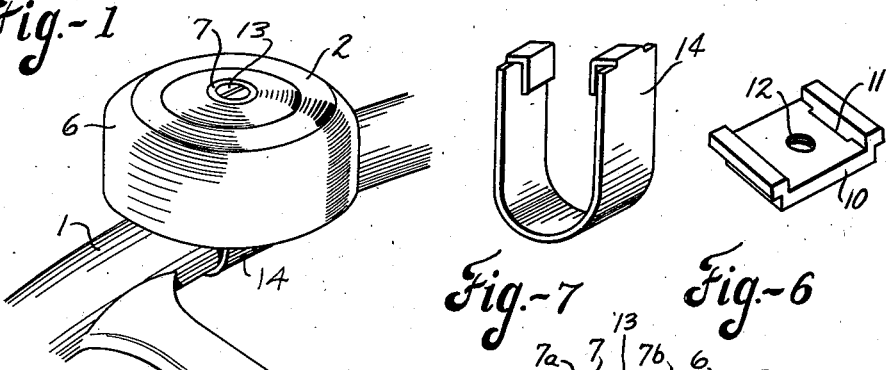
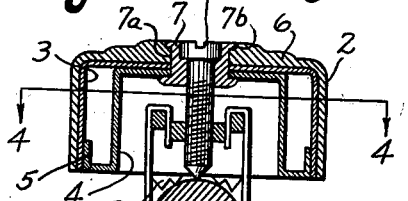
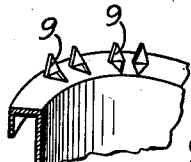
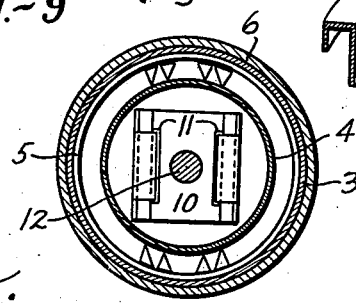
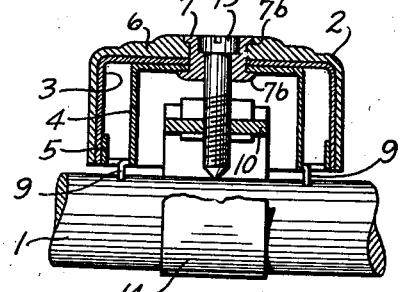
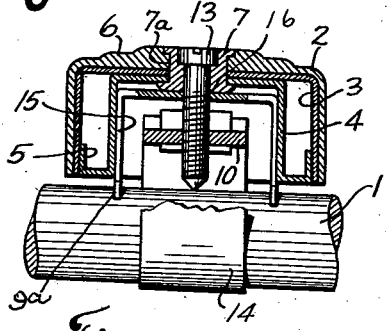
Inventor
Linus E. Russell
George E. Peters
By J. L. Walker
Attorney Patented Dec. 23, 1941

2,267,308

UNITED STATES PATENT OFFICE 2,267,308

STEERING WHEEL KNOB

Linus E. Russell and George E. Peters, Springfield, Ohio, assignors to Peters & Russell, Inc., Springfield, Ohio, a corporation of Ohio Application August 29, 1940, Serial No. 354,742

12 Claims. (Cl. 74—557)

This invention pertains to automobile steering wheels, and more particularly to a swivel knob or spinner to be mounted thereon, and to the particular construction and method of mounting the same.

The use of steering wheel knobs or spinners pivotally mounted on the steering wheel rim for use as a handle in rotating the wheel has become quite common. However, in all instances the knob is elevated a considerable distance above the plane of the wheel and supported on a stem or stud which is subjected to lateral leverage strain while using the knob. Such construction frequently breaks under excessive strain in emergency operation, and in case of accident such protruding knob and the trunnion stud therefor are quite likely to cause injury to the driver. They are difficult to hold and, protruding from the wheel, are likely to catch in a coat sleeve or entangle in other clothing.

To overcome the objectionable features of the former type of spinner knobs there is here provided a relatively low flat knob disposed in close symmetrical relation with the steering wheel rim, and mounted for rotation about a correspondingly broad low trunnion.

The object of the invention is to provide a steering wheel knob or spinner which may not only be economically manufactured, but which will be efficient in use, of strong, sturdy construction, having relatively few parts, and unlikely to get out of repair.

A further object of the invention is to provide an improved form of mounting trunnion for steering wheel knobs and an improved means for attaching such device to the rim of a steering wheel.

A further object is to provide a knob of low compact form and regular outline, mounted in close relation to the plane of the steering wheel.

A further object of the invention is to provide a steering wheel knob which will be less dangerous and of such form and construction that likelihood of personal injury in event of accident is minimized.

A further object of the invention is to provide a steering wheel knob possessing the advantageous structural features and inherent meritorious characteristics herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawing.

In the accompanying drawing, wherein is shown the preferred but not necessarily the only form of embodiment of the invention, Fig. 1 is a perspective view of a steering wheel knob embodying the present invention, mounted on a fragment of a conventional steering wheel.

Fig. 2 is a vertical sectional view of the assembled knob.

Fig. 3 is a vertical sectional view at right angle to that of Fig. 2.

Fig. 4 is a transverse sectional view on line 4—4 of Fig. 2.

Fig. 5 is a fragmentary detail view of the locating teeth.

Fig. 6 is a perspective view of the draw plate.

Fig. 7 is a perspective view of the clamp strap.

Fig. 8 is a sectional view and Fig. 9 a detail perspective view illustrating a modification of the mounting means.

Like parts are indicated by similar characters of reference throughout the several views.

In the drawing, 1 indicates a portion of the rim of a conventional steering wheel for an automobile, tractor, or other motor vehicle, to which the present knob 2 is applied.

The knob comprises two concentric inverted cups 3 and 4 nested one inside the other. The inner inverted cup shaped shell 4 is stationarily secured to the wheel rim and includes a bottom marginal upturned flange 5, which affords a broad, low trunnion, about which the outer inverted cup shaped shell 3 which forms the handle to be grasped by the operator is relatively rotatable. The inner trunnion shell 4 is preferably, although not necessarily, drawn from sheet metal. The outer revoluble handle grip 3 is preferably of ornamental character and may also be formed from sheet metal suitably embossed, etched or contoured to afford a pleasing appearance. However, for economical production, and artistic appearance, the outer shell 3 is encased in an adherent covering 6 of molded phenolic condensation or synthetic resinous materials, or, if desired, may be covered with leather, fabric, enamel or other surface finish.

The concentric relatively revoluble shells 3 and 4 are axially interconnected with each other by a short concentric pivotal coupling 7 having an axial hole therein. The pivotal coupling 7 is of grommet or rivet form having a short neck 7a with relatively spaced flanged heads 7b overlapping the interior of the head or terminal face of the inner trunnion shell 4 and the exterior of the head or terminal face of the outer handle grasp shell 3 respectively. While this grommet-like connection interconnects the respective shells 3 and 4 for relative rotation, the actual bearing surface upon which the grasp portion rotates is the exterior peripheral face of the flange 5 of the inner shell 4. Thus there is afforded a bearing surface of very large radius, but of relatively short axial extent, which will effectively resist lateral strain leverage. The trunnion in this instance is substantially of as great diameter as the handle grasp member 3 revoluble thereon.

The pivotal coupling 7 has therein a central hole to receive a clamp screw for detachably securing the knob to the wheel rim 1, as hereafter described.

The marginal upturned angular flange 5 stiffens and reinforces the inner shell 4. It is provided at diametrically opposite points with two groups of short teeth 9 struck from the bottom of the flange and engageable with the wheel rim. The teeth of each group are preferably of different length to agree with the transverse curvature of the rim 1 of the steering wheel with which the respective groups of teeth engage when the knob is mounted thereon. Interiorly of the inner stationary shell 4 is a draw plate or head 10 having in its ends parallel spaced slots 11. A medial screw threaded opening 12 is provided in the plate 10 for reception of a clamp screw 13 inserted through the central opening in the pivotal coupling 7. A flexible stirrup or metal strap 14 encloses the rim of the wheel with its ends reversely bent about the terminals of the draw plate 10 and engaged in the transverse slots 11 thereof. By adjustment of the screw 13, which is accessible on top of the assembly, the plate 10 may be retracted to forcibly draw the wheel rim into tight engagement with the protruding teeth 9 and thereby fixedly secure the assembly upon the wheel rim.

As an alternative means of securing the knob in position of the wheel rim and in lieu of the struck-up serrations or teeth 9, there is shown in Figs. 8 and 9 a separate thrust member 15. The member 15 is arch shaped and of a size to be received inside the inner shell 4. The extremities of the legs of this member 15 are serrated at 9a for engagement with the wheel rim. A medially disposed hole 16 permits passage of the clamp screw 13 freely therethrough, the adjustment of which draws the rim 1 tightly against the serrations 9a of the arch member 15, the top of which abuts upon and is clamped against the inner end of the pivotal coupling 7.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described our invention, we claim:

1. A steering wheel knob, including an inverted circular cup shaped shell, an outwardly and upwardly turned bottom margin on said shell, a second inverted circular cup shaped shell inclosing the first shell and having rotary bearing engagement on the upturned exterior face of the bottom margin thereof, a double headed hollow pivotal connection axially connecting the shells for rotary motion but preventing axial displacement thereof, an adjusting screw extending through the hollow pivotal connection, a cross head within the inner shell engaged by the screw, a strap formed into a bight to enclose a support, the ends of which are connected to the cross head, the construction and arrangement of the aforementioned parts being such that the adjustment of the screw will cause a support to be clamped within the bight of the strap against the margin of the first mentioned shell, leaving the second mentioned shell free for rotation about the upturned bearing flange.

2. A knob assembly comprising two relatively rotatable cup shaped shells disposed one inside the other and having inner and outer peripheral revoluble engagement one with the other, means for pivotally interconnecting the shells and limiting the axial displacement of said shells relative to each other, and clamp means located within the inner cup shaped shell for fixedly securing the assembly to a support.

3. A knob assembly including two concentric circular inverted shells, one nested within the other in radially spaced relation, a lower marginal upturned flange on one of the shells forming an annular bearing surface engageable with the other shell for relative rotation thereof, and clamp means located within the inner shell for engagement with a support.

4. A steering wheel knob comprising a recessed revoluble body having a diameter at least twice its height, and a recessed mounting therefor contained within the recess of the body and engageable with a vehicle steering wheel, affording an axis substantially perpendicular to the plane of the steering wheel about which the said body is revoluble, and means within the recess of the mounting for detachably engaging said mounting with the steering wheel.

5. A steering wheel knob comprising a recessed disc-like body having a cylindrical peripheral face and an approximately flat top face, the diameter of which is approximately twice its axial depth, a pivotal mounting therefor enclosed within the recess of said body about which the disc-like body is revoluble, and an attachment device axially disposed relative to the revoluble body and accessible from the top face of said body for detachably engaging the mounting with a vehicle steering wheel.

6. A knob assembly including two relatively rotatable inverted cup shaped shells, one nested within the other, a grommet-like pivotal coupling pivotally interconnecting the shells, including a tubular stud having relatively spaced heads engaging with the respective shells, and means operable through the bore of said tubular stud for fixedly securing the inner shell to a support for rotation of the outer shell thereabout.

7. A knob assembly including two interconnected concentric relatively revoluble inverted cup shaped shells, one nested within the other, serrations at diametrically opposite points on the bottom margin of the inner shell engageable with a support, and clamp means also engageable with a support for adjustably maintaining the inner shell and support in relatively fixed interengaging relation wherein the outer shell is free for rotation about the fixed support-engaging inner shell.

8. A knob assembly including two interconnected concentric relatively revoluble inverted cup-shaped shells disposed one within the other, mounting means therefor including relatively spaced groups of serrations disposed in diametrically opposite relation relative to the shells for engagement with a support, and a cooperating member also engageable with the support in opposition to the serrated teeth for clamping the support therebetween, the construction and arrangement of the aforementioned parts being such that the outer shell is free for rotation about the inner shell in a position fixed relative to a support.

9. A knob assembly including an inverted cup-shaped revoluble shell, a mounting therefor, a central pivotal coupling interconnecting the revoluble shell and mounting against relative axial movement, and an enlarged circular bearing surface on the mounting with which the inner-peripheral wall of the shell has rotative bearing engagement, and means within the mounting for detachably securing the mount to a support.

10. In a knob assembly a rotative grasp portion, a recessed mount therefor with which the rotative grasp portion has double pivotal connection, including an axial pivotal connection at the top of the grasp portion and the mount, and an annular bearing of greater diameter adjacent the bottom of the rotative grasp portion and an attachment device within the recess of the mount by which the assembly is detachably engageable with a support.

11. A knob assembly including two inverted relatively revoluble cup-shaped shells, an axial pivotal connection therebetween at their tops, interengaging bearing surfaces between the side walls of said members adjacent their bottoms, and means within the inner shell for fixedly securing the inner shell to a support, leaving the outer shell free for rotation thereabout.

12. A knob comprising two concentric inverted cup shaped shells, one nested within the other, and having inner and outer peripheral engagement one with the other, a central pivotal coupling interconnecting the shells for relative rotation and having an axial opening therein, a clamp screw extending through the axial opening of the pivotal coupling, and a clamp member adjusted thereby and cooperating with the inner shell member to clamp the assembly upon a support while permitting relative rotation of the outer shell about the inner shell.

LINUS E. RUSSELL.
GEORGE E. PETERS.